United States Patent [19]

Hartmann

[11] Patent Number: 4,721,015
[45] Date of Patent: Jan. 26, 1988

[54] THREE STAGE PLANETARY DRIVING WHEEL FOR PEDAL POWERED VEHICLES

[76] Inventor: Dirck T. Hartmann, 4121 Morningstar Dr., Huntington Beach, Calif. 92649

[21] Appl. No.: 904,941

[22] Filed: Sep. 8, 1986

[51] Int. Cl.[4] .......................... F16H 3/70; F16H 3/62
[52] U.S. Cl. ................... 74/750 B; 74/781 B; 280/260
[58] Field of Search ............... 74/750 B, 781 B, 785; 280/236, 238, 260

[56] References Cited

U.S. PATENT DOCUMENTS

| | | | |
|---|---|---|---|
| 619,118 | 2/1899 | Barnes | 280/260 |
| 707,359 | 8/1902 | Scharbach | 74/347 |
| 1,184,321 | 5/1916 | Chapin | 280/270 |
| 1,506,565 | 8/1924 | Clatworthy | 280/7.15 |
| 1,798,384 | 3/1931 | Roberds | 280/260 |
| 2,505,464 | 4/1950 | Debuit | 280/260 |
| 3,803,947 | 4/1974 | Hillyer | 74/750 B |
| 3,809,195 | 5/1974 | Schulz et al. | 74/750 B X |
| 3,863,503 | 2/1975 | Loeb et al. | 74/347 |
| 3,920,263 | 11/1975 | Bundschuh | 280/106 |
| 3,934,481 | 1/1976 | Foster | 74/190.5 |
| 4,065,984 | 1/1978 | Nakajima | 74/750 B |
| 4,447,068 | 5/1984 | Brooks | 280/260 |
| 4,666,172 | 5/1987 | Hartmann | 74/750 B X |

FOREIGN PATENT DOCUMENTS

| | | |
|---|---|---|
| 0029359 | 5/1981 | European Pat. Off. . |
| 0010201 | 6/1983 | European Pat. Off. . |
| 0158466 | 10/1985 | European Pat. Off. . |
| 2610644 | 9/1977 | Fed. Rep. of Germany . |
| 336281 | 3/1959 | Switzerland ............ 750 B/ |

Primary Examiner—Lawrence Staab
Assistant Examiner—Dwight G. Diehl

[57] ABSTRACT

A three stage, sixteen-speed, planetary driving wheel, with the pedal drive shaft on the axis of the wheel and vehicle interface fittings on both sides inboard of the pedal crank arms, for mounting in pedal powered vehicles to replace the chain and derailleur system used in conventional multiple speed bicycles. Because the planetary gear arrangement is completely enclosed inside the wheel hub where it is well protected from dirt, and because this driving wheel provides five low range speeds below direct drive, it is well suited for mountain bicycles or for transporting the payload of a bicycle camper up steep grades.

5 Claims, 6 Drawing Figures

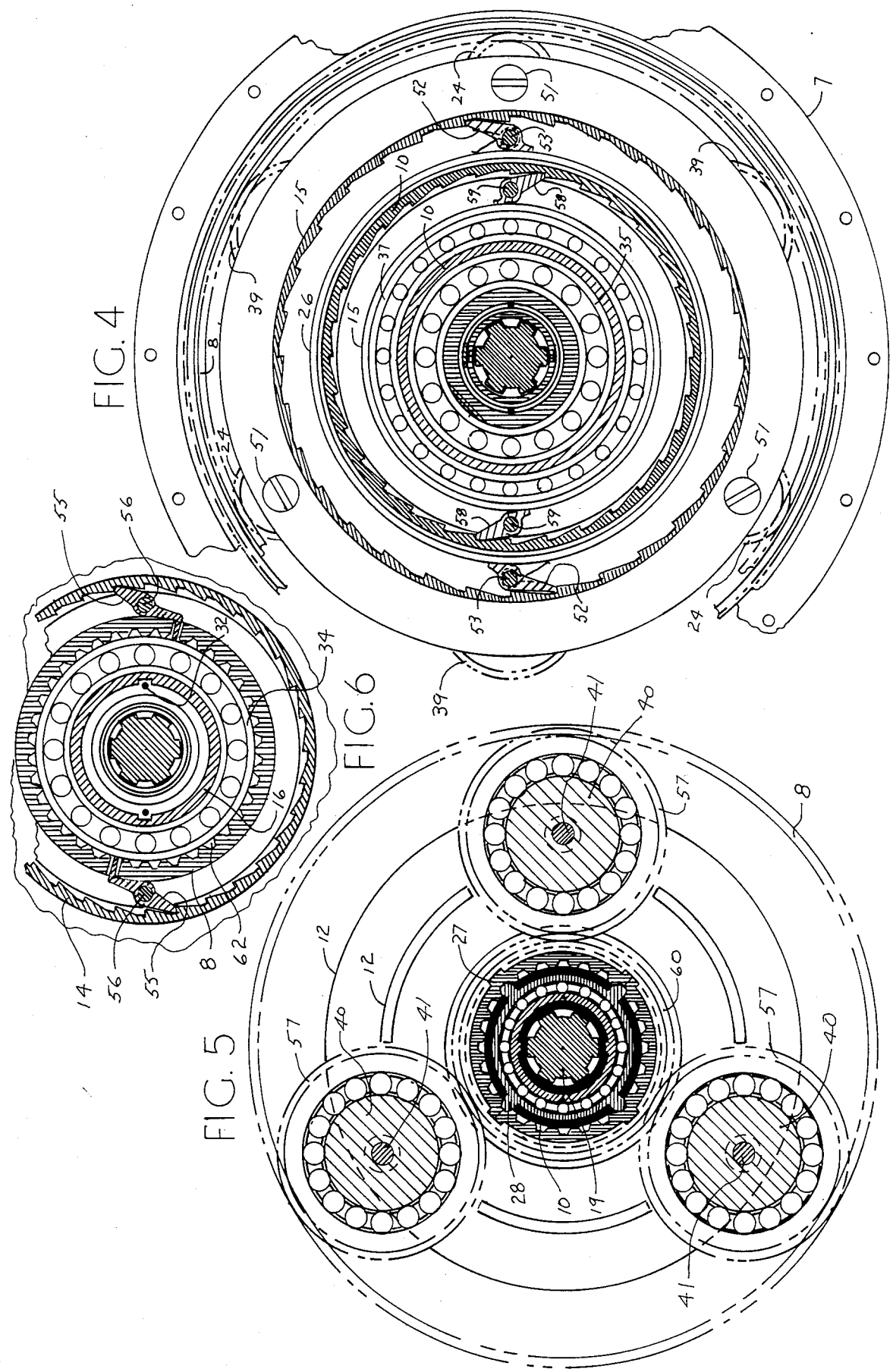

THREE STAGE PLANETARY DRIVING WHEEL FOR PEDAL POWERED VEHICLES

BACKGROUND OF THE INVENTION

1 Field of the Invention

This invention relates generally to drive mechanisms for pedal powered vehicles such as bicycles and tricycles and more particularly to bicycle drive mechanisms of the chainless planetary type.

2. Description of the Prior Art

The most common multiple speed bicycle uses a chain and derailleur system. The chain requires periodic cleaning and oiling to prevent premature chain failure and must be removed from the rear sprocket to change the tire. Chain maintenance is particularly troublesome if the bicycle is ridden extensively on dirt roads and trails. Also, when the rider is bearing down hard on the pedals on a hill, the derailleur usually will not carry the chain to a lower gear. Consequently, with a chain/derailleur system, the cyclist must anticipate the terrain and shift gears before getting on a hill in a gear that is too high, since he may not then be able to shift to a lower gear. Further, all the gears of a conventional ten or twelve speed drive are not efficiently usable because of the angle the chain makes with the sprockets, and shifting is not done in a simple set sequence that is easily mastered. These problems are eliminated with the present invention, as will be seen.

The transmission described in U.S. Pat. No. 2,505,464 by Debuit is a chainless type, located on the axis of the front wheel concentric with the pedal drive shaft, but Debuit's transmission is not planetary, is mounted alongside the wheel hub rather than inside it, is limited in the number of gear ratios it makes available (four plus a direct drive option), and carries the pedal torque through single gear teeth requiring large-tooth gears to prevent early fatigue failure.

SUMMARY OF THE INVENTION

An object of this invention is to provide a compact, durable, low maintenance, multiple speed drive suitable for pedal powered vehicles intended for off-road operation, a particular embodiment being adapted for use on a bicycle camper, with gear ratios low enough to permit transporting the camper payload up steep grades, and high enough to permit conventional bicycle speeds on paved roads.

The three stage planetary driving wheel in accordance with the present invention includes a pedal drive shaft mounted in bearings on the axis of the wheel; a sun gear carrier, a planet gear carrier, and a ring gear all rotatably mounted inside the wheel hub; five sets of different size planet gears with three planet gears in each set mounted on bearings in the planet gear carrier, with each planet gear in constant mesh with a sun gear freely rotating on the sun gear carrier, and in constant mesh with the ring gear; a drive fitting with its axial position adjustable for selectively driving either the ring gear or the planet gear carrier from the pedal drive shaft; means for locking any selected one of the freely rotating sun gears to the sun gear carrier; means for selectively locking either the ring gear or the sun gear carrier to the vehicle frame; and three free-wheel ratchet mechanisms coupling, respectively, the planet gear carrier, the ring gear, and the sun gear carrier with the wheel hub. Five first stage speeds are obtained by driving the ring gear from the pedal drive shaft with the sun gear locked to the vehicle frame and with the planet gear carrier driving the wheel hub through the first free-wheel ratchet mechanism. A direct drive is obtained by driving the planet gear carrier from the pedal drive shaft with both the ring gear and the sun gear carrier free to rotate. Five second stage speeds are obtained by driving the planet gear carrier from the pedal drive shaft with the sun gear locked to the vehicle frame and with the ring gear driving the wheel hub through the second free-wheel ratchet mechanism; and five third stage speeds are obtained by driving the planet gear carrier from tne pedal drive shaft with the ring gear locked to the vehicle frame and the sun gear carrier driving the wheel hub through the third free-wheel ratchet mechanism. Thus, sixteen speeds are available with this particular embodiment of the present invention.

Other aspects and advantages of the present invention will become apparent from the following more detailed description taken in conjunction with the accompanying drawings.

BRIEF DESCRIPTION OF THE DRAWINGS

FIG 4 is a partial cross sectional view taken along the line 4—4 of FIG. 2;

FIG. 5 is a partial cross sectional view taken along the line 5—5 of FIG. 2; and FIG. 6 is a partial cross sectional view taken along the line 6—6 of FIG. 2.

DESCRIPTION OF THE PREFERRED EMBODIMENT

Figure 2:
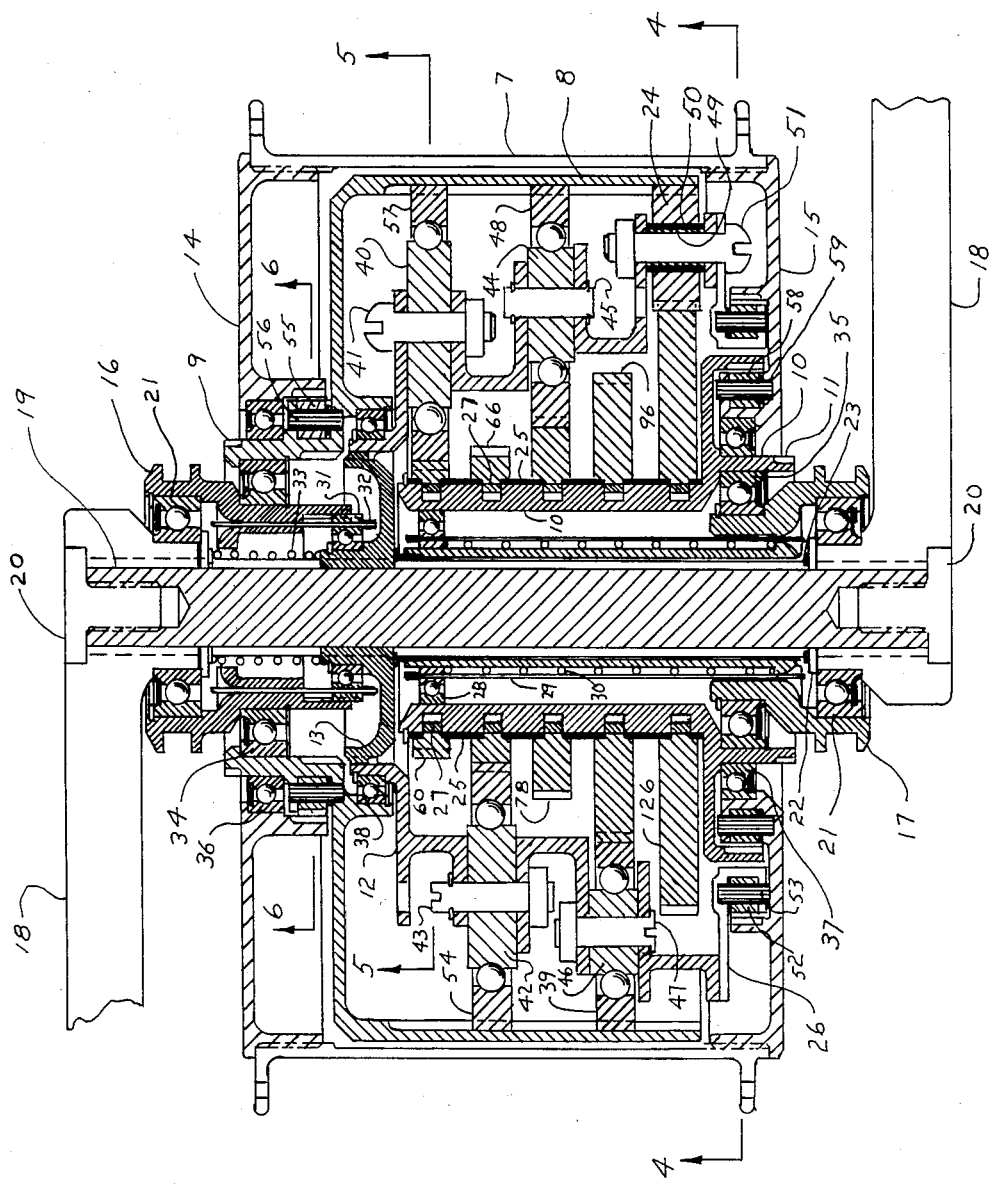
FIG. 2 is an enlarged cross sectional view taken along the line 2—2 of FIG. 1.

Referring to FIG. 2, the planetary driving wheel in accordance with the present invention includes a wheel hub 7; a ring gear 8; ring gear locking teeth 9; a sun gear carrier 10; sun gear carrier locking teeth 11; a planet gear carrier 12; a drive fitting 13; a second stage driving plate 14; a first and third stage driving plate 15; a right side vehicle frame interface fitting 16; a left side vehicle frame interface fitting 17; pedal crank arms 18; and pedal drive shaft 19.

The pedal drive shaft 19 is splined for the transfer of torque from the crank arms 18 to the drive fitting 13. The crank arms 18 and drive shaft 19 are held centered in the vehicle frame interface fittings 16 and 17 by the ball bearings 21. Each of the crank arms 18 is held seated against a splined washer 22 and snap ring 23 by a spanner bolt 20. The inner race of each of the bearings 21 is captive between a shoulder on its respective crank arm 18 and the washer 22, and the outer race is captive between a snap ring and a shoulder on its associated vehicle frame interface fitting 16 or 17.

The ring gear 8 is held centered on the right side vehicle frame interface fitting 16 by the ball bearing 34. The inner race of the bearing 34 is captive between a snap ring and a shoulder on the interface fitting 16, and the outer race is captive between a snap ring and a shoulder on the ring gear 8. The right side driving plate 14, which is installed in the wheel hub 7 with right hand threads so that the driving torque is tightening, is held centered on the ring gear 8 by the ball bearing 36.

Figure 1:
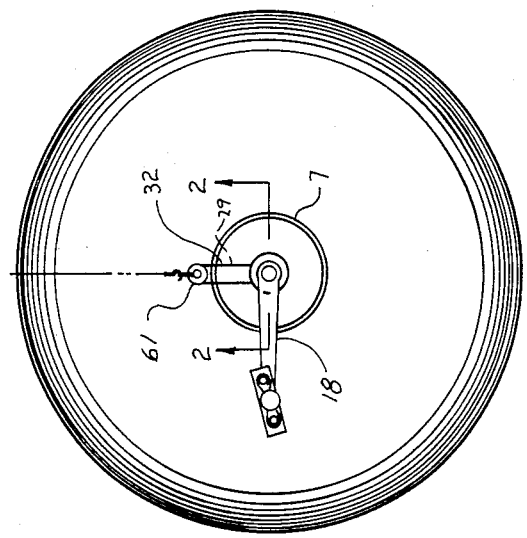
FIG. 1 is a right side elevation view of the planetary driving wheel.
Figure 3:
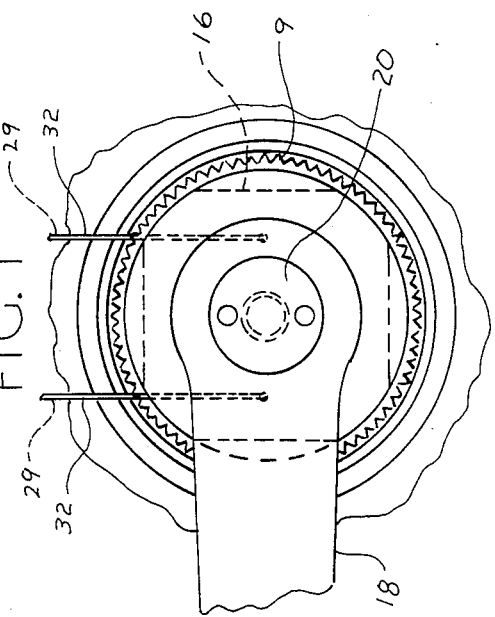
FIG. 3 is an enlarged partial view of the central portion of the wheel hub.

The axial position of the drive fitting 13 is adjustable between an inboard position where it drives the planet gear carrier 12, and an outboard position where it drives the ring gear 8. The drive fitting 13 is held in its inboard position by the compression spring 33 which holds the drive fitting seated against a snap ring on the drive shaft 19. Movement to the outboard position is accomplished with the drive fitting positioner 31, which is fabricated in the form of a ball bearing with its inner race captive in the drive fitting 13, and its outer race keyed to axial tracks in the frame interface fitting 16. Axial location of the positioner 31 is controlled by the positioner actuation cable 32 which passes out through two axial holes in the vehicle frame interface fitting 16, wraps around a 90 degree radius in the outboard end of each of the axial holes, and, as seen in FIG. 1, wraps around the pulley 61 whose position is controlled by a two position lever of the vehicle frame.

As best seen in FIG. 6, the ring gear 8 has an internal spline 62 for engaging the drive fitting 13 which matches an identical internal spline in the planet gear carrier 12. As seen in FIGS. 2 and 6, a pair of spring loaded dogs 55 are installed in the ring gear 8 with steel pins 56. The dogs 55 engage machined cogs in the second stage driving plate 14 in a conventional free-wheel ratchet arrangement, and drive the wheel when the ring gear is driven by the selected set of planet gears. When the ring gear is driven by the drive fitting 13, a tooth on the drive fitting 13 engages a radial tab on each of the dogs 55 and holds the dogs out of engagement with the cogs machined in the driving plate 14 so that the wheel can be driven at a rate slower than the ring gear.

As seen in FIG. 2, the sun gear carrier 10 is held centered on the left side vehicle frame interface fitting 17 by the ball bearing 35. The inner race of the bearing 35 is captive between a snap ring and a shoulder on the vehicle frame interface fitting 17, and the outer race is captive between a snap ring and a shoulder on the sun gear carrier 10. The first and third stage driving plate 15, which is installed in the left end of the wheel hub with left hand threads so that the driving torque is tightening, is held centered on the sun gear carrier by the ball bearing 37. As seen in FIGS. 2 and 4, a pair of spring loaded dogs 58 are installed in the driving plate 15 with the steel pins 59 and engage cogs machined in the sun gear carrier 10 in a conventional free-wheel ratchet arrangement so that the sun gear carrier drives the wheel. As also seen in FIGS. 2 and 4, the spring loaded dogs 52 are installed in the first stage drive ring 26 with steel pins 53. The drive ring 26 is attached to the planet gear carrier 12 with three screws 51. The dogs 52 engage cogs machined in the driving plate 15 so that the ring 26 drives the wheel when the sun gear is locked against rotation.

As seen in FIG. 2, a split ring 27 is installed in each of five circumferential grooves in the sun gear carrier 10. An involute sun gear is installed over each of the five split rings with projections on the split rings 27 keying them to the gears, as seen in FIG. 5. The sun gears slide freely on oil-filled porous bronze bushings 25 which maintain the spacing between the gears. The five sun gears have 60, 66, 78, 96, and 126 teeth, respectively, as noted in FIG. 2. Speed selection is achieved through locking a selected one of the five sun gears to the sun gear carrier 10 by positioning a sun gear selector 28 in the plane of the selected gear with a sun gear selector actuation cable 29.

As seen in FIG. 5, four radial projections on the sun gear selector 28 slide in axial slots in the sun gear carrier 10 and key the split ring in the plane of which it is located to the sun gear carrier. The sun gear selector 28 is made up in the form of a ball bearing with the outer race keyed to and rotating with the sun gear carrier, and with the inner race keyed to an integral cylindrical extension of the vehicle frame interface fitting 17. The axial position of the selector 28 is controlled by the sun gear selector return spring 30 and the selector actuation cable 29 which passes out through two diametrically opposed axial holes in the vehicle frame interface fitting 17, wraps around a 90 degree internal radius in the end of each of the axial holes and passes out through two parallel holes orthogonal to the axial holes to wrap 180 degrees around a pulley 61 in an arrangement identical to that shown in FIG. 1 for the drive fitting positioner actuation cable 32.

As shown in FIG. 2, the planet gear carrier 12 is held centered inside an inboard cylindrical extension of the ring gear 8 by a ball bearing 38. The inner race of the bearing 38 is captive between a snap ring and a shoulder on the planet gear carrier 12, and the outer race is captive between a snap ring and a shoulder on the ring gear 8. Five sets of planet gears, with three planet gears in each set, are installed on bearings in the planet gear carrier 12, with each set of planet gears in constant mesh with the 174 tooth ring gear 8 and with one of the five sun gears freely rotating on the sun gear carrier 10. As shown in FIGS. 2 and 5, three 57 tooth planet gears, in mesh with the 60 tooth sun gear, are each mounted on a ball bearing 40 with the inner race of the bearing clamped in the planet gear carrier 12 by a screw 41. Three 54 tooth planet gears, in constant mesh with the 66 tooth sun gear, are mounted on the ball bearing 42 with the inner race of the bearing 42 clamped in the planet gear carrier 12 with a screw 43. Three 48 tooth planet gears, in constant mesh with the 78 tooth sun gear, are each mounted on a ball bearing 44 with a pin 45 in the planet gear carrier 12. Three 39 tooth planet gears, in constant mesh with the 96 tooth sun gear, are each mounted on a ball bearing 46 with the inner race of the bearing clamped in the planet gear carrier 12 with a screw 47. Three 24 tooth planet gears, in constant mesh with the 126 tooth sun gear, are each mounted on an oil-filled porous bronze bushing 50, with the bushing 50 rotating on a polished steel sleeve 49, with the sleeve 49 clamped in the planet gear carrier 12 by the screw 51. The three planet gears in each set are located 120 degrees apart, as shown in FIG. 5, and the planet gears in adjacent sets are located 60 degrees apart. 32 pitch gears are used in the 16-speed example design selected to illustrate the planetary driving wheel in accordance with the present invention.

The exposed outboard end of an integral cylindrical extension on the ring gear 8 has an external tooth form 9, and the exposed outboard end of an integral cylindrical extension on the sun gear carrier 10 has an identical external tooth form 11, which are used for locking the ring gear or the sun gear carrier against rotation through engagement with actuated blocks with mating tooth forms sliding in tracks on the vehicle frame. When the sun gear carrier 10 is locked against rotation and the ring gear 8 is driven from the pedal drive shaft 19 by the drive fitting 13, with the wheel hub driven by the planet gear carrier 12, the first stage gear ratio is given by $(0.5N+n)/(N+n)$ where N is the number of teeth on the selected sun gear and n is the number of teeth on each of the three mating planet gears.

When the sun gear carrier 10 is locked against rotation and the planet gear carrier 12 is driven from the pedal drive shaft 19 by the drive fitting 13 with the ring gear 8 driving the wheel hub, the second stage gear ratio is given by $(N+n)/(0.5N+n)$ where, as before, N is the number of teeth on the selected sun gear, and n is the number of teeth on each of the three mating planet gears.

When the ring gear 8 is locked against rotation and the planet gear carrier 12 is driven from the pedal drive shaft 19 by the drive fitting 13 with the sun gear carrier 10 driving the wheel hub, the third stage gear ratio is given by $(N+n)/0.5N$. In the table below the number of teeth on the selected sun gear and on each of its mating planet gears is given with the resulting gear ratios for each stage together with the vehicle speed for a pedal speed of 80 rpm and a 27 inch diameter driving wheel. In the example design selected to illustrate the planetary driving wheel in accordance with the present invention, 32 pitch gears are used with 174 teeth and a resultant pitch diameter of 5.4375 inches for the ring gear 8.

|  | SPEED | N | n | RATIO | MPH |
| --- | --- | --- | --- | --- | --- |
| first stage | one | 126 | 24 | .580 | 3.727 |
|  | two | 96 | 39 | .644 | 4.138 |
|  | three | 78 | 48 | .690 | 4.433 |
|  | four | 66 | 54 | .725 | 4.659 |
|  | five | 60 | 57 | .744 | 4.781 |
|  | six | direct | drive | 1.00 | 6.426 |
| second stage | seven | 60 | 57 | 1.345 | 8.643 |
|  | eight | 66 | 54 | 1.379 | 8.861 |
|  | nine | 78 | 48 | 1.448 | 9.305 |
|  | ten | 96 | 39 | 1.552 | 9.973 |
|  | eleven | 126 | 24 | 1.724 | 11.078 |
| third stage | twelve | 126 | 24 | 2.381 | 15.300 |
|  | thirteen | 96 | 39 | 2.813 | 18.076 |
|  | fourteen | 78 | 48 | 3.231 | 20.762 |
|  | fifteen | 66 | 54 | 3.636 | 23.365 |
|  | sixteen | 60 | 57 | 3.900 | 25.061 |

The gears and resulting gear ratios listed above are presented for illustrative purposes and the present invention should not be considered as limited to them.

While this invention has been described in terms of a preferred embodiment, it is anticipated that persons reading the preceding descriptions and studying the drawings will realize many possible modifications thereof. For example, two or four planet gears could be used in each set instead of three, and they could be rotatably mounted on the planet gear carrier with roller bearings or plain bearings instead of ball bearings. Likewise, the addition of a sun gear and mating set of planet gears would result in a nineteen speed planetary driving wheel, while the deletion of a sun gear and mating set of planet gears would result in a thirteen speed driving wheel.

It is therefore intended that the following appended claims be interpreted as including all such modifications and alterations as fall within the true scope and spirit of the present invention.

I claim:

1. An improved three stage planetary driving wheel for a pedal powered vehicle including a frame, said wheel having a rotational axis and comprising:

a central hub;

a pedal drive shaft mounted on said axis of said planetary driving wheel for concentric rotation with said hub;

a planet gear carrier mounted for concentric rotation about said pedal drive shaft;

multiple sets of different size planet gears rotatably carried by said planet gear carrier, including multiple planet gears of the same size in each set;

an internally toothed ring gear in constant mesh with all of said multiple sets of planet gears and mounted for rotation about said pedal drive shaft;

ring gear locking teeth on an exposed outboard end of a cylindrical extension of said ring gear;

drive fitting splinded to said pedal drive shaft and axially operative for selectively engaging said ring gear or said planet gear carrier for driving said ring gear or said planet gear carrier, respectively, from said pedal drive shaft;

drive fitting positioning means;

a sun gear carrier mounted for concentric rotation about said pedal drive shaft;

multiple externally toothed sun gears rotatably mounted on said sun gear carrier with each of said multiple sun gears in constant mesh with one of said multiple sets of planet gears;

sun gear locking means operative for selectively locking any one of said multiple sun gears to said sun gear carrier;

sun gear carrier locking teeth on an exposed outboard end of a cylindrical extension of said sun gear carrier;

first stage free-wheel ratchet means coupled between said hub and said planet gear carrier for driving said hub;

second stage free-wheel ratchet means coupled between said hub and said ring gear for driving said hub;

third stage free-wheel ratchet means coupled between said hub and said sun gear carrier for driving said hub;

a vehicle frame interface fitting on each side of said hub;

a ball bearing inside of each vehicle frame interface fittings centering on each end of said pedal drive shaft; and a pedal crank arm fixed on each end of said pedal drive shaft for rotation outboard of said vehicle frame interface fittings.

2. A planetary driving wheel according to claim 1 wherein said sun gear locking means includes an inboard integral cylindrical extension on an associated one of said vehicle frame interface fittings; said integral cylindrical extension includes external axial grooves; said sun gear carrier includes multiple external circumferential grooves and a plurality of internal axial grooves; multiple split rings having external teeth and internal teeth being installed in said multiple circumferential grooves, respectively; said multiple sun gears receiving said split rings, respectively; said external teeth on said split rings locking said split rings to said sun gears for rotation therewith; and including a sun gear selector having an outer race keyed to said sun gear carrier for rotation therewith, and further having an inner race keyed to said integral cylindrical extension of said vehicle frame interface fitting; said internal teeth on said split rings keying said split rings to said sun gear selector; said internal axial grooves in said sun gear carrier and said external axial grooves in said cylindrical extension of said vehicle frame interface fitting permitting axial movement of said sun gear selector relative to said split rings for engaging one of said split rings and locking the associated one of said sun gears to said sun gear carrier; and wherein said associated one of said vehicle frame interface fittings includes a return spring and a first cable means, and said first cable means is operative to control the axial position of said sun gear selector.

3. A planetary driving wheel according to claim 2 wherein said first cable means includes a pair of diametrically opposed axial holes through the associated one of said vehicle frame interface fittings, each of said axial holes being characterized at its outboard end by a full internal radius; a pair of parallel holes through said vehicle frame interface fitting immediately outboard of said hub; said parallel holes being oriented orthogonal to and intersecting said axial holes; and including a pulley located in the plane of said parallel holes; a cable wrapping around 180 degrees of said pulley; said cable passing through both of said parallel holes, wrapping around 90 degrees of each said internal radius and passing through both of said axial holes, with both ends of said cable captive in said inner race of said sun gear selector; and a cable carried by said pedal powered vehicle operative for positioning said pulley.

4. A planetary driving wheel according to claim 1 wherein said drive fitting positioning means includes an inboard integral cylindrical extension on an associated one of said vehicle frame interface fittings; said integral cylindrical extension including internal axial grooves; a drive fitting positioner having an outer race keyed to said internal axial grooves of said integral cylindrical extension, and further having an inner race captive in said drive fitting for rotation therewith; said drive fitting includes an external spline; said planet gear carrier includes an internal spline and said ring gear includes an internal spline, said splines being selectively alternately engaged with said external spline on said drive fitting to be driven thereby; said internal axial grooves in said integral cylindrical extension of said vehicle frame interface fitting permitting axial movement of said drive fitting positioner for selectively engaging said drive fitting with said planet gear carrier or said ring gear; and said associated one of said vehicle frame interface fittings includes a return spring and a second cable means, said second cable means being operative to control the axial position of said drive fitting positioner.

5. A planetary driving wheel according to claim 4 wherein said second cable means includes a pair of diametrically opposed axial holes through the associated one of said vehicle frame interface fittings, each of said axial holes being characterized at its outboard end by a full internal radius; said vehicle frame interface fitting includes a pair of parallel holes immediately outboard of said hub; said parallel holes being oriented orthogonal to and intersecting said axial holes; and including a pulley located in the plane of said parallel holes; a cable wrapping around 180 degrees of said pulley and passing through both of said parallel holes, wrapping around 90 degrees of each said internal radius, and passing through both of said axial holes, with both ends of said cable captive in said outer race of said drive fitting positioner; and including a cable carried by said pedal powered vehicle operative for positioning said pulley.

* * * * *